United States Patent [19]

Schwab

[11] Patent Number: 5,321,088
[45] Date of Patent: Jun. 14, 1994

[54] GRAFT COPOLYMERS OF POLYETHYLENE AND POLYCAPROLACTONE

[75] Inventor: Frederik C. Schwab, Metuchen, N.J.

[73] Assignee: Mobil Oil Corporation, Fairfax, Va.

[21] Appl. No.: 973,859

[22] Filed: Nov. 9, 1992

[51] Int. Cl.$^5$ ............................................. C08F 8/00
[52] U.S. Cl. .................................... 525/186; 524/35; 524/47; 524/502; 525/333.7; 525/386
[58] Field of Search ............... 525/186, 333.7; 524/35, 524/47, 502

[56] References Cited

U.S. PATENT DOCUMENTS

| | | | |
|---|---|---|---|
| 3,021,309 | 2/1962 | Cox et al. | 260/78.3 |
| 3,021,317 | 2/1962 | Cox et al. | 260/78.3 |
| 3,919,163 | 11/1975 | Clendinning et al. | 525/186 |
| 5,130,371 | 7/1992 | Fujita et al. | 525/186 |

*Primary Examiner*—Bernard Lipman
*Attorney, Agent, or Firm*—Alexander J. McKillop; Malcolm D. Keen; Marina V. Schneller

[57] ABSTRACT

The invention relates to the production of a graft copolymer of polycaprolactone and of polyethylene containing functional groups. The copolymer shows good strength properties compared to linear low density polyethylene.

4 Claims, No Drawings

GRAFT COPOLYMERS OF POLYETHYLENE AND POLYCAPROLACTONE

FIELD OF THE INVENTION

The invention relates to the production of graft copolymers of lactones, lactides and polymers thereof with polyethylene containing functional groups. The copolymer shows improved strength properties compared to linear low density polyethylene.

BACKGROUND OF THE INVENTION

Disposable containers and bags in the market today are predominantly made of plastics. In these applications, it can be desirable to provide the plastic as a composition which is biodegradable.

The current emphasis on ecology, and in particular, the disposal of bulk rubbish, is in part directed to coping with the tremendous increase in the use of plastic containers and plastic films for packaging foodstuffs, and garbage wraps and the like which not only present a serious disposal problem but increase unsightly litter in picnic areas, on roadside and the like.

Polyethylene per se is not readily biodegradable.

It is an object of the present invention to provide an ethlene resin which is biodegradable. It is an object of the invention to provide a biodegradable ethylene resin which exhibits yield strengths and break strengths which are at least substantially equivalent to the non-biodegradable LLDPE counterpart.

SUMMARY OF THE INVENTION

The invention relates to graft copolymers which exhibit excellent tensile strength compared to linear low density polyethylene. The graft copolymer comprise the reaction product of caprolactone, lactide and polycaprolactone with ethylene polymers and copolymers containing pendant functional groups. The graft copolymers contain 20 to 80 weight percent polycaprolactone.

The invention also relates to a process for converting non-biodegradable ethylene polymers and copolymers, to products which are biodegradable graft copolymers. The graft copolymers include reaction of the ethylene polymer or copolymer containing pendant functional groups with lactide, caprolactone or polycaprolactone.

DETAILED DESCRIPTION OF THE INVENTION

The biodegradable high yield strength and high break strength polymers are formed by grafting caprolactone, polycaprolactones onto labile, reactive, functional groups, of ethylene resins which are homopolymers or copolymers of ethylene.

The graft copolymer contains 1 to 99% by weight caprolactone (or lactide) or polycaprolactone and 99 to 1% ethylene containing resin. Preferably, the graft copolymer contains 40 to 99% by weight caprolactone (or lactide) or polycaprolactone and 60 to 1% ethylene containing resin. Practically, the graft copolymer contains 50 to 80% by weight caprolactone (or lactide) or polycaprolactone and 20 to 50% ethylene containing resin.

Caprolactone, specifically epsilon caprolactone, is commercially available. Polycaprolactone is a polymer produced from epsilon-caprolactone. Cf. U.S. Pat. Nos. 3,021,309–3,021,317. The polymerization to form the polycaprolactone occurs with ease. The polymer can be depicted by the formula, $-[(CH_2)_5(C=O)O]_n-$. The polymer is crystalline, melts at around 60° C., and begins to decompose to monomer at temperatures above 250° C. It resembles medium density polyethylene in stiffness (ca 350 MPa, stiffness modulus) and has a waxy feel. In a preferred embodiment the polycaprolactone contains a terminal hydroxy group. The caprolactone or polycaprolactone is derivatized to react with the ethylene resin.

Ethylene resins include ethylene resins modified to contain pendant functional groups. Preferably copolymers of ethylene are used. Ethylene copolymers which can be used which are readily commercially available contain pendant functional groups which are used directly or derivatized for reaction with the caprolactone or polycaprolactone. Such ethylene copolymers which can be used which are readily commercially available and which can be used in the preparation of the biodegradable graft copolymers include copolymers with acrylic acid, copolymers with methacrylic acid, copolymers with methyl acrylate, copolymers with ethylacrylate, copolymers with vinyl acetate, copolymers with vinylalcohol. These ethylene resins are not biodegradable.

In a preferred embodiment, the method of rendering the ethylene resins biodegradable is to react them with the epsilon caprolactone, lactide or polycaprolactone. In one of these embodiments an ionic form of the ethylene resin, particularly a derivative of an ionic form of an ethylene resin containing pendant functional groups, —COOH, is reacted with the polycaprolactone. In one embodiment, the carboxylic acid groups of the ethylene polymer are derivatized with a reagent such as thionyl chloride. In another embodiment, methanesulfonyl chloride, and the like, is reacted with the polycaprolactone, preferably containing a terminal hydroxy group. Alternatively, the caprolactone monomer can be combined with the ethylene resin containing pendant —OH groups in the presence of a catalyst for polymerization of the caprolactone; the method allows the polymerization of the cyclic ester monomer using active site(s) on the polyethylene backbone. This allows a variety of other cyclic ester monomers to be used, e.g. lactides, glycolides, pivolactone, etc.

For product fabrication, the graft copolymers may be blended to contain commercial quantities of color and antiblocking agents. The blend quantities of color and antiblocking agents ranges from up to 5%, preferably up to 4% and most preferably up to 3% of linear low density polyethylene containing blend.

In addition to the polymer components, the blend may also contain any of various additives conventionally added to polymer compositions for different purposes, e.g. lubricants such as microtalc, stabilizers, compatibilizers, pigments, starch and cellulose, etc.

The graft copolymers may be processed using any of various methods known in the art. For example, pellets of the graft copolymers may be dry blended and the blend added directly to a blown film extruder, e.g., a Sterling extruder, to produce films having a thickness, for example, of about 0.5 to 5 mils. Blown film is relatively thin as compared to film or sheet used in molding operations and is generally used in flexible packaging. Tubular products, for example, bags, can be produced. The tube may also be slit to form flat film. The film may also be oriented.

The following examples further illustrate the invention.

EXAMPLES

EXAMPLE 1

A quantity (6.7 gm.) of a monohydroxyl terminated polycaprolactone (molecular weight of about 25,000) was dissolved in 49 ml. of toluene. To the solution was added 0.5 ml. of methanesulfonyl chloride (0.129 moles) and 0.2 ml pyridine; the mixture was allowed to react for 16 hours at 70° C. The methylated product was then added to a solution of the potassium salt of an ethylene acrylic acid copolymer (6.5% acrylic acid) in toluene (3% weight/volume.)

The potassium salt of the ethylene/acrylic acid copolymer (EAA) was made by dissolving 10 gm. of the EAA copolymer in 350 m. toluene to which 0.5 grams potassium hydroxide in 10 ml. methanol and 2.38 gm. of 18-crown-6 were added. About 50 ml. of solvent was removed to rid the system of the methanol.

After letting the system react for about 8 hours at 80° C., most of the toluene was stripped off and the graft polymer precipitated by the addition of methanol. Extraction of the product with warm methanol resulted in a 5.8% loss in weight presumably non-grafted polycaprolactone. The final graft copolymer contained about 36% polycaprolactone.

When the graft copolymer was compression molded at about 150° C., a clear film was obtained. Thermal analysis of the copolymer showed two melting points (54° C.-polycaprolactone and 96° C.-polyethylene) indicative of a two phase system. Tensile properties of compression molded films show good strength properties when compared to linear low density polyethylene:

|  | Graft Copolymer | LLDPE |
| --- | --- | --- |
| Yield strength, psi | 1290 | 1190 |
| Break strength, psi | 5000 | 3570 |
| Elongation, % | 300 | 800 |

Preliminary biological testing of this material shows about 3-4% $CO_2$ evolution after 10 days. High amounts of chemically bound biodegradable polycaprolactone allow for fabrication of tough films which can be biologically degraded.

EXAMPLE 2

A quantity of 2 grams of an ethylene-acrylic acid copolymer containing 6.5% acrylic acid was dissolved in 40 ml of toluene and heated to 80° C. to dissolve the copolymer. A volume of 0.58 ml. of thionyl chloride was added and the mixture was allowed to react overnight at 80° C. Two grams of a monohydroxylterminated polycaprolactone was dissolved in 10 ml toluene and the resulting solution added to the reaction product of ethylene-acrylic acid copolymer and thionyl chloride mentioned above. A small amount of pyridine (0.14 ml) was added as an acid scavenger. The resultant graft copolymer was precipitated in methanol, filtered and dried. The resultant graft copolymer contained 28% polycaprolactone and molded into a clear, tough film.

EXAMPLE 3

The stannous octoate approach differs from the other two examples in that the cyclic ester monomer (e.g., caprolactone) is polymerized using the active site(s) on the polyethylene backbone.

A hydroxy-functionalized polyethlene was produced by the hydrolysis of an ethylene-vinyl acetate copolymer containing 9% vinyl acetate by the addition of potassium hydroxide dissolved in methanol to a solution of the copolymer in toluene at 75° C. The resultant product was a copolymer of ethylene and vinyl alcohol containing 9% vinyl alcohol groups. The grafting was accomplished by dissolving 10 grams of caprolactone in 100 ml xylene (dried over $CaH_2$.) To this solution was added 10 grams of the ethylene-vinyl alcohol copolymer and dissolved at 115° C. To this solution was added 0.3 ml stannous octoate and the mixture allowed to polymerize overnight at 115° C. The resulting product was precipitated in hexane and dried. Yield was 20.0 grams of a graft copolymer containing 50% polycaprolactone. Thermal analysis of the clear copolymer film showed two distinct melting points, one at 43° C. for the polycaprolactone and one at 99° C. for the polyethylene.

This same approach was used to produce a poly(lactic acid) grafted polyethylene from the polymerization of the lactide.

Soil burial tests on the grafted copolymer are given below:

| Time Weeks | Soil Burial Weight Loss, % | | | |
| --- | --- | --- | --- | --- |
|  | Caprolactone-g-PE** | Lactide-g-PE | Starch* | Cellulose |
| 2 | 1.0 | 0.53 | 1.3 | 56.8 |
| 4 | 1.0 | 0.81 | 2.2 | 100 |
| 10 | 1.14 | 0.99 | 3.1 | — |
| 17 | 4.3 | 1.30 | 3.0 | — |
| 32 | 4.4 | 13.4 | 3.3 | — |
| 52 | 4.8 | 32.8 | 4.0 | — |

*6% starch in LLDPE
**Caprolactone grafted to polyethylene

Thus it is apparent that there has been provided, in accordance with the invention, a graft copolymer, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A biodegradable composition, for film production, comprising a copolymer which comprises a polyethylene backbone wherein said copolymer comprises 1 to 99 weight percent ethylene units and 1 to 99% by weight of an adduct of caprolactone or $-[(CH_2)_5(C=O)X]_n$ wherein X is oxygen and n is 1 and up to a number sufficient to provide a molecular weight of 1,000,000, wherein said adduct is grafted to said backbone, which is formed by a process comprising providing a polymer or a copolymer of ethylene containing a functional group selected from the group consisting of an —OH group, converting the functional group to a derivative by contacting said polymer or said copolymer with a epsilon caprolactone or lactide in the presence of a catalyst which is stannous octoate, at a temperature greater than 80° C. and up to 150° C. to produce a clear transparent composition.

2. The composition of claim 1, wherein copolymer contains 40 to 99% by weight of the adduct grafted to said backbone.

3. The composition of claim 1, wherein copolymer contains 50 to 80% by weight of the adduct grafted to said backbone.

4. The composition of claim 1, which further includes starch, cellulose or admixtures thereof.

* * * * *